US006580719B1

(12) United States Patent
Soboleva et al.

(10) Patent No.: US 6,580,719 B1
(45) Date of Patent: Jun. 17, 2003

(54) METHOD FOR DETERMINING THE NUMBER OF ACCESSES GRANTED DURING WCL AND APPARATUS

(75) Inventors: Marianna Soboleva, St. Petersburg (RU); Sergej Makevev, St. Petersburg (RU); Andrey Artamonov, St. Petersburg (RU); Richard Soja, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/297,854

(22) PCT Filed: Nov. 5, 1997

(86) PCT No.: PCT/EP97/06105
§ 371 (c)(1),
(2), (4) Date: May 6, 1999

(87) PCT Pub. No.: WO98/20425
PCT Pub. Date: May 14, 1998

(30) Foreign Application Priority Data

Nov. 6, 1996 (RU) .............................................. 96122056

(51) Int. Cl.[7] .............................. H04L 12/28; H04J 3/16
(52) U.S. Cl. ..................................... 370/412; 370/468
(58) Field of Search ................................ 370/412, 468, 370/230, 229, 230.1, 433, 415

(56) References Cited

U.S. PATENT DOCUMENTS

| | | | | | |
|---|---|---|---|---|---|
| 5,311,513 A | * | 5/1994 | Ahmadi et al. | ............ | 370/468 |
| 5,313,641 A | * | 5/1994 | Simcoe et al. | ............ | 710/242 |
| 5,418,967 A | * | 5/1995 | Simcoe et al. | ............ | 709/207 |
| 5,434,848 A | * | 7/1995 | Chimento et al. | ............ | 370/468 |
| 5,528,766 A | * | 6/1996 | Ziegler et al. | ............ | 370/468 |

OTHER PUBLICATIONS

Modular Micro Controller Family TPU Time Processor Unit; Reference Manual; Published by Motorola, Inc.; Chapter 3; pp. 3–1 to 3–7.

"Time clustered access for maximizing bandwidth utilization via windows of asynchronous arrival", IBM technical disclosure bulletin, vol. 37, No. 8, Aug. 1994, New York, US, pp 201–214, XP000456391, see whole document.

Tamir et al: "Symmetric crossbar arbiters for VLSI dommunication switches", IEEE Transactions on parallel and distributed systems, vol. 4, No. 1, Jan. 1993, US, pp 13–27, XP000381322, see p. 19, col. 2—p. 20, col. 1.

Modular Microcontroller Family "TPU, Time Processor Unit Reference Manual", Rev.2, by Motorola, Inc. 1993, Appendix C, pp C–1 to C–20.

* cited by examiner

Primary Examiner—Chau Nguyen
Assistant Examiner—Keith M. George

(57) ABSTRACT

In a method for determining a worst case service latency, first a number of accesses granted to requesting channels during the worst case service latency is determined. Therefore, the ordered list of priorities and the priority passing rules of a scheduler of the queuing system is taken into consideration so that an accurate number of access requests during the worst case service latency results. According to the number of access requests, states are selected for the different requesting channels so that the sum of the state execution times reaches a maximum according to the applicable priority passing rules. This method can be implemented by a computer program and can be advantageously used for design of an apparatus which incorporates a queuing system, such as in automobile electronics.

6 Claims, 7 Drawing Sheets

| AMOUNT OF ACTIVE H-CHANNELS(nh) | AMOUNT OF SLOTS IN WCL | | |
|---|---|---|---|
| | H-SLOTS | M-SLOTS | SUM(S) |
| 1 | 1 | 1 | 2 |
| 2 | 2 | 1 | 3 |
| 3 | 3 | 2 | 5 |
| 4 | 4 | 2 | 6 |
| 5 | 5 | 2 | 7 |
| 6 | 6 | 3 | 9 |
| 7 | 7 | 3 | 10 |
| 8 | 8 | 4 | 12 |
| 9 | 9 | 4 | 13 |
| 10 | 10 | 4 | 14 |
| 11 | 11 | 5 | 16 |
| 12 | 12 | 5 | 17 |
| 13 | 13 | 6 | 19 |
| 14 | 14 | 6 | 20 |
| 15 | 15 | 6 | 21 |

WCL OF HIGH PRIORITY CHANNEL
FORMULA 1: S=H-SLOTS+M-SLOTS
FORMULA 2: H-SLOTS=NH
FORMULA 3: M-SLOTS=2* (INT)(NH/5)+M-ADD
FORMULA 4: L-SLOTS=0
FORMULA 5: REST=NH-[(INT)(NH/5)]* 5=NH % 5

WCL OF MIDDLE PRIORITY CHANNEL
FORMULA 6: S=3* NM+(INT)[(NM+1)/2]
FORMULA 7: H-SLOTS=S-NM
FORMULA 8: M-SLOTS=NM
FORMULA 9: L-SLOTS=0

*FIG.12*

FORMULA 10: S=2* NH-(INT)(NH/4)
FORMULA 11: H-SLOTS=NH:
FORMULA 12: M-SLOTS=2* (INT)(NH/4):
FORMULA 13: L-SLOTS=(INT)(NH/4);
FORMULA 14: REST=NH-[(INT)(NH/4)] * 4=NH % 4

ALL PRIORITIES PRESENT WCL OF HIGH-PRIORITY CHANNEL

| AMOUNT OF ACTIVE H-CHANNELS(nh) | AMOUNT OF SLOTS IN WCL | | | |
|---|---|---|---|---|
| | H-SLOTS | M-SLOTS | L-SLOTS | SUM(S) |
| 1 | 1 | 1 | – | 2 |
| | 1 | – | 1 | |
| 2 | 2 | 1 | 1 | 4 |
| 3 | 3 | 2 | 1 | 6 |
| 4 | 4 | 2 | 1 | 7 |
| 5 | 5 | 3 | 1 | 9 |
| | 5 | 2 | 2 | |
| 6 | 6 | 3 | 2 | 11 |
| 7 | 7 | 4 | 2 | 13 |
| 8 | 8 | 4 | 2 | 14 |
| ... | | | | |

*FIG. 13*

ALL PRIORITIES PRESENT WCL OF MIDDLE-PRIORITY CHANNEL

| AMOUNT OF ACTIVE M-CHANNELS(nm) | AMOUNT OF SLOTS IN WCL | | | |
|---|---|---|---|---|
| | H-SLOTS | M-SLOTS | L-SLOTS | SUM(S) |
| 1 | 2 | 1 | 1 | 4 |
| 2 | 4 | 2 | 1 | 7 |
| 3 | 6 | 3 | 2 | 11 |
| 4 | 8 | 4 | 2 | 14 |
| 5 | 10 | 5 | 3 | 18 |
| 6 | 12 | 6 | 3 | 21 |
| 7 | 14 | 7 | 4 | 25 |
| 8 | 16 | 8 | 4 | 28 |
| ... | | | | |

FORMULA 15: $S = 3*NM + (INT)[(NM+1)/2]$
FORMULA 16: $H\text{-}SLOTS = 2*NM$;
FORMULA 17: $M\text{-}SLOTS = NM$;
FORMULA 18: $L\text{-}SLOTS = (INT)[(NM+1)/2]$

*FIG. 14*

ALL PRIORITIES PRESENT WCL OF LOW-PRIORITY CHANNEL

| AMOUNT OF ACTIVE L-CHANNELS(nl) | AMOUNT OF SLOTS IN WCL | | | |
|---|---|---|---|---|
| | H-SLOTS | M-SLOTS | L-SLOTS | SUM(S) |
| 1 | 4 | 2 | 1 | 7 |
| 2 | 8 | 4 | 2 | 14 |
| 3 | 12 | 6 | 3 | 21 |
| 4 | 16 | 8 | 4 | 28 |
| 5 | 20 | 10 | 5 | 35 |
| ... | | | | |

FORMULA 19: $S = 7*nl$ OF WHICH:
FORMULA 20: $H\text{-}SLOTS = 4*nl$;
FORMULA 21: $M\text{-}SLOTS = 2*nl$;
FORMULA 22: $L\text{-}SLOTS = nl$.

METHOD FOR DETERMINING THE NUMBER OF ACCESSES GRANTED DURING WCL AND APPARATUS

FIELD OF INVENTION

This invention generally relates to the field of queuing systems, and more particularly to the determination of worst case latency (WCL).

BACKGROUND OF THE INVENTION

In a queuing system there are typically a number of channels which can access system resources. As the system resources are shared, only one channel at a time can be granted access. If there are multiple contending access requests of different channels, a pre-defined schematics is employed in prior art queuing systems to select one of the requesting channels for granting of the system resources. After grant the selected requesting channel is the master of the system resources during a certain time slot which can be of fixed or variable length. After the time slot another requesting channel is selected from the waiting queue for grant according to the schematics. Such a schematics typically is implemented in an bus arbiter or scheduler.

Such queuing systems can be found in multi processor systems where a plurality of processors is coupled to the same bus which can only service one processor at a time. Another field of application is in the field of micro controllers. A micro controller has a number of input/output channels which can access the common system resources of the micro controller to perform different kinds of calculations and transformations according to the needs of the technical environment. Micro controllers are used in a wide field of applications, for example in automobile electronics, control electronics of household appliances, control systems of chemical factories as well as in mobile telephone systems.

In such applications the channels connected to the micro controller serve to interact with the real world technical environment. To comply with the needs of the technical environment each channel has to have a minimum band width to ensure proper operation of the technical system. In such a system it is highly desirable to guarantee a minimum channel band width also under worst case operating conditions to prevent failure.

To facilitate the design of a queuing system a method for determining the worst case latency (WCL) has to be employed. The more accurate such a method is, the more effective the common system resources of the resulting queuing system can be used by the requesting channels. From the "Modular micro controller family TPU Time processor Unit", Reference Manual, published by Motorola, Inc., especially appendix C a method of estimating worst-case service latency in a queuing system relying on a scheduler which applies a priority scheme with priority passing rules is known. No method has been available to exactly determine the worst-case latency with mathematical exactness and without having to add security margins.

It is therefore an object of the invention to provide an improved method for determining a number of accesses granted to requesting channels in a queuing system as well as an improved computer program for carrying out such a method and an apparatus being designed accordingly.

SUMMARY OF THE INVENTION

This and other problems are solved by the invention basically by applying the features laid down in the independent claims. Preferred embodiments are given in the dependent claims.

The inventions allows to determine a number of access granted to requesting channels during WCL of a selected channel of the system. This number of access can be used for different purposes during the system design. In particular, the duration of the WCL itself can be determined based on this number of access according to the invention.

The invention is particularly advantageous in that it allows to carry out the calculation of the worst case service latency automatically by means of a computer. This allows to investigate a large number of different timing scenarios in order to optimize the queuing system for the particular needs of the technical environment.

Further the method of the invention yields accurate results so that it is not necessary to add security margins in the system to guarantee minimal band width for all channels. As a consequence an apparatus which is designed accordingly features improved utilization of the system resources and thereby allows more accurate control or faster operating speed of the overall technical system according to it's field of use.

Figure 1:
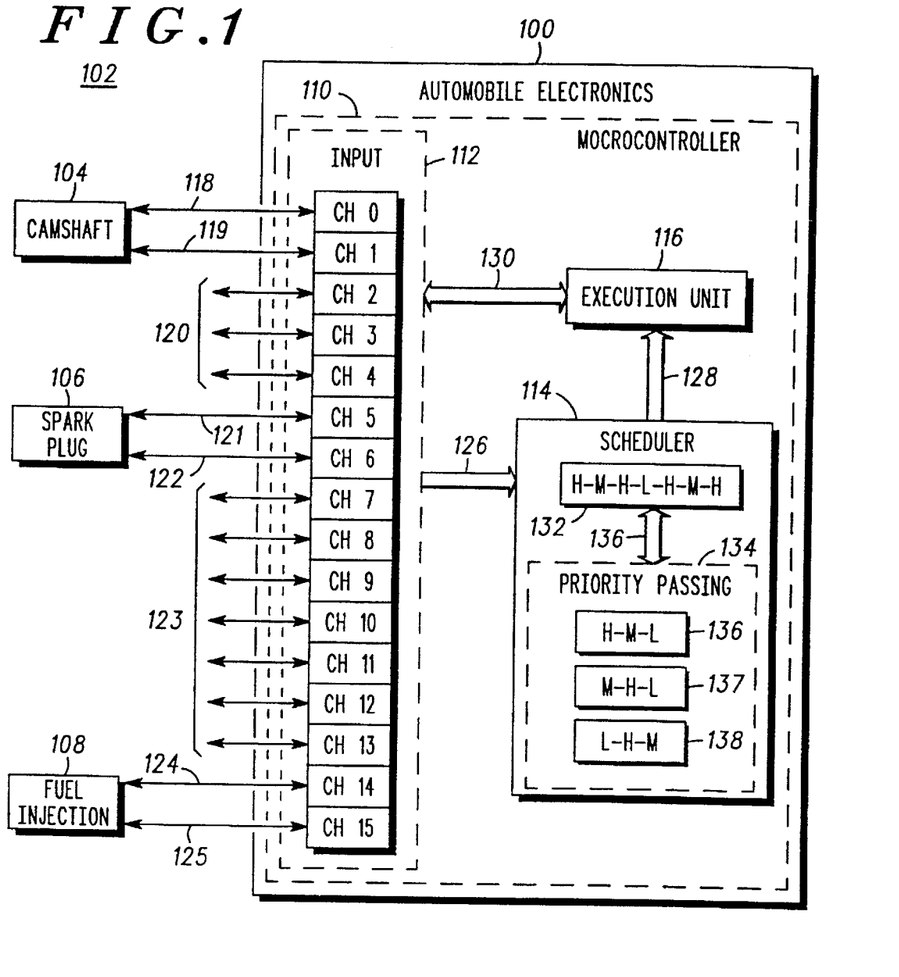
FIG. 1 shows a schematic block diagram of an apparatus which has a queuing system in accordance with the principles of the invention.

FIG. 1 shows automobile electronics 100 which is built in an automobile 102. By way of example FIG. 1 shows cam shaft 104, spark plugs 106 and fuel injector 108 of the automobile 102. For simplicity the other parts of the automobile 102 are not shown in FIG. 1.

Automobile electronics 100 comprises a queuing system designed by employing the principles of the invention. The automobile electronics 100 is realized by means of a micro controller 110. The micro controller 110 comprises an input array 112 as well as a scheduler 114 and an execution unit 116.

The input array 112 has a dedicated input for each channel CH0–CH15 of the micro controller 110. In the example considered here the input for channel CH0 is connected to the cam shaft 104 via bi-directional signal line 118. Likewise the input for channel CH1 is also connected to the cam shaft 104 via signal line 119. Signal lines 121 and 122 connect spark plugs 106 to the inputs for channels CH5 and CH6 whereas lines 124, 125 connect the fuel injector 108 to inputs for channels CH14 and CH15, respectively.

The groups of signal lines 120 and 123 connect the inputs for channels CH2, CH3, CH4 and CH7–CH13, respectively to other devices of the automobile 102 which are not shown in the drawing. Each of the signal lines 118 to 125 can carry measurement and/or control signals for the device of the automobile 102 to which it is connected. For example, via the signal lines 118, 119 data is transmitted to the respective inputs of the micro controller 110 which is representative of the operation of the cam shaft 104. This information is required for the control of the spark plugs 106 and the fuel injector 108.

The input array 112 is coupled to the scheduler 114 via uni-directional signal line 126 whereas the scheduler 114 is coupled to the execution unit 116 via unidirectional signal line 128. The execution unit 116 is coupled to the input array 112 via the bi-directional data bus 130.

Scheduler 114 comprises storage devices 132 and 134 which are interconnected by bi-directional data bus 136.

In the storage device 132 an ordered list of priorities is stored for requesting channels whereas in storage device 134 a number of priority passing rules is stored.

In the example considered here, each-of the inputs for channels CH0–CH15 can have one priority of a set of three priorities. In this example the set of priorities comprises only the three priorities high, middle and low. As a consequence the ordered list of priorities stored in storage device 132 consists of a sequence of high "H", middle "M" and low "L" priorities. In the storage device 134 there are three priority passing rules 136, 137 and 138 to modify the ordered list of priorities stored in storage device 132 according to a particular operational condition of the micro controller 110.

If the automobile 102 is in operation it happens that at the same time channels having high, middle and low priority require access to the shared system resources of the micro controller 110 which is the execution unit 116. Such access requests are transmitted via the signal line 126 from the input array 112 to the scheduler 114.

The scheduler 114 has the task to grant access to the execution unit 116 via the bi-directional data bus 130 for one of the requesting channels access. This is done according to the ordered list of priorities stored in storage device 132 and according to the priority passing rules 136, 137, 138 which are stored in the storage device 134:

At the beginning the scheduler grants a high priority channel access to the execution unit 116 since the first element in the ordered list of priorities is "H". This grant is valid during a certain time slot. For the consecutive time slot a middle priority channel is granted access to the execution unit 116 since the 2nd element in the ordered list of priorities is "M". Likewise further accesses are granted in the order of high, low ("L"), high, middle and high priority channels. With the last granting for a high priority channel the end of the ordered list is reached so that the control returns back to the beginning of the ordered list. As a consequence the ordered list is stepped through repeatedly.

When the scheduler steps through its ordered list of priorities, there are situations when the scheduler can grant access to a channel having a certain priority but there is no requesting channel having this priority. For example, if the next requesting channel to be granted access is a low priority channel according to the ordered list of priorities, but at that time there is no access request from a low priority channel the problem occurs to which one of the other high and middle priority channels access can be granted. This problem is solved by applying the priority passing rule 138:

According to the priority passing rule 138 the priority passes from low to high and from high to middle priority. This means that in the first step the low priority in the ordered list of priorities is replaced by a high priority. If at the time of the low priority time slot in the ordered list of priorities there is no requesting channel having a low priority but one or more channels having a high priority the scheduler grants access to the execution unit 116 to one of the requesting high priority channels.

If there is also no access request from a high priority channel at the time of the low priority time slot the scheduler grants access to one of the requesting middle priority channels.

Likewise, if the scheduler has to grant access to one of the requesting channels for a middle priority time slot in the ordered sequence of priorities the priority passing rule 137 applies if at the time of the middle priority time slot there is no corresponding request from a middle priority channel. In this case the transition is from middle to high priority and then if also no request from a high priority channel is present—to low priority.

Analogously, rule 136 applies for high priority time slots for which the transition is from high to middle and from middle to low priority. This concept of priority passing as such is also described in "Modular micro controller family TPU Time Processor Unit", Reference Manual, published by MOTOROLA, INC., especially on page 3-3.

For proper operation of the automobile electronics 100 a certain band width has to be guaranteed for each of the channels also under worst case operating conditions. The worst case band width directly corresponds to worst case service latency (WCL). The WCL is the longest time span which can elapse between a request of a channel and the execution of the corresponding state of the function belonging to this channel. The concept of WCL as such has already been contemplated on page C-2 of the above referenced manual.

In order to guarantee proper operation of the automobile electronics 100 the actual WCL of each channel must not surpass a predefined maximal WCL which corresponds to the minimal band width required for the channel to comply with the needs of its associated device such as spark plugs 106 or fuel injector 108. Therefore one embodiment of the method of the invention is used to determine the actual WCL under different operating conditions.

If during the design phase of the automobile electronics 100 non compliance of the system performance with the requirements of the minimal band width is found, the system design has to be changed accordingly. This means that a middle priority channel has to be redefinded to be a high priority channel or that additional processing power has to be added. Since the actual WCL can be determined accurately already during the design of the automobile electronics 100 the proper assignments of channels to the required minimal priorities can be made so that no system resources are wasted for too high priority assignments.

In particular, it is not necessary to add security margins to the processing power since the WCL can be determined exactly in advance, even before field testing.

Hence by making usage of an embodiment of the method of the invention during the design of the automobile electronics 100 an optimized system results making optimal usage of the shared system resources while at the same time guaranteeing proper operation also in worst case conditions.

Figure 2:
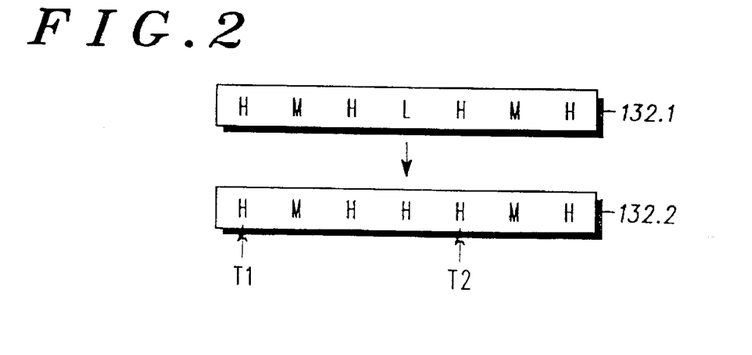
FIG. 2 shows an ordered list of priorities which is used in the scheduler of the apparatus of FIG. 1.

FIG. 2 shows the ordered list of priorities 132.1 which is stored in the storage device 132 shown in FIG. 1. If the priority passing rule 138 is applied according to the example considered above with respect to FIG. 1 the ordered list of priorities 132.1 is altered which yields the altered list of priorities 132.2.

The altered list of priorities 132.2 corresponds to a case when only requesting channels belonging to a sub-set of the set of priorities high, middle, low is present. In the case considered here this sub-set consists of requesting channels of the high and middle priority type. The altered list of priorities 132.2 applies for such a case where no low priority channels issue access requests to the scheduler 114.

In order to determine a number of accesses granted to requesting channels during WCL of a selected one of the requesting channels the corresponding worst time slot in the altered list of priorities 132.2 has to be determined. The worst time slot is the time slot for which the largest number of accesses is granted during WCL to other requesting channels.

Figure 3:
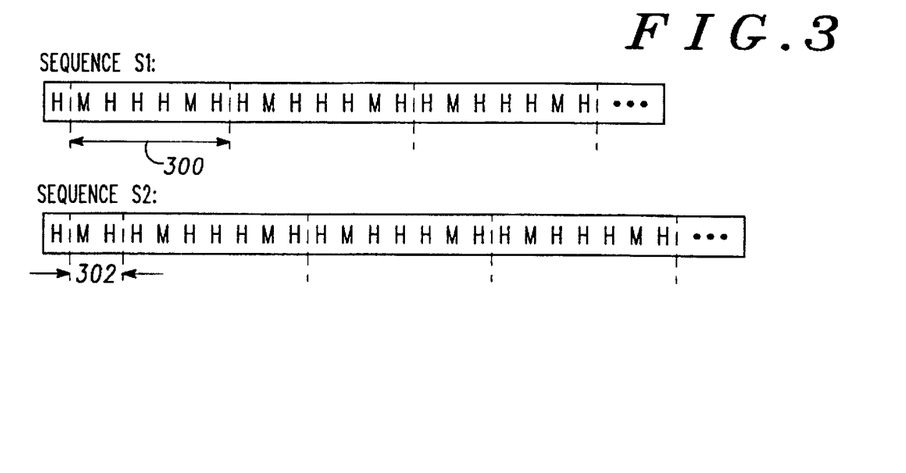
FIG. 3 shows two sequences of time slots to determine a worst time slot for an access request.

FIG. 3 shows how such a worst time slot can be found. The aim is to identify the worst time slot for a high priority channel. A worst time slot for a high priority channel to raise its access request can only be a time slot which precedes a time slot having another priority. Hence, in the case considered here the time slots which could be worst time slots for a high priority channel can only be the time slots denoted as T1 and T2 in the sequence of priorities 132.2 of FIG. 2 which both precede a middle priority time slot.

The sequence S1 of FIG. 3 shows the resulting list of priorities for the scheduler if the time slot T1 is considered. After the access request of the high priority channel during the time slot T1 is issued the rest of the list of priorities M-H-H-H-M-H of the list of priorities 132.2 is stepped through during time interval 300 as depicted in FIG. 3. When the scheduler reaches the end of the list of priorities 132.2 it goes back to the beginning so that the same list 132.2 is stepped through repeatedly until an empty high priority slot occurs which can be assigned to the requesting high priority channel. The same applies analogously to the sequence S2 which corresponds to the time slot T2 in the sequence 132.2. If the time slot T2 is the time slot in which the high priority channel raises its access request the time interval 302 results until the scheduler reaches the end of the list 132.2.

When the time intervals 300 and 302 are compared, the following occurs: during the time interval 300 there are four high priority time slots and only two middle priority time slots so that there are twice as many high priority time slots than middle priority time slots. As opposed to this in the time interval 302 there is one middle priority time slot and one high priority time slot so that the number of high and middle priority time slots is the same. As a consequence the sequence S2 is the worst sequence for a high priority access request since the relative number of high and middle priority time slots is the lowest.

As a consequence the time slot T2 in the list 132.2 is the worst time slot in terms of WCL for an access request of the selected high priority channel.

In the following it is shown how the number of accesses granted to requesting channels during WCL for a selected requesting channel is determined based on the sequence S2.

Figure 4:
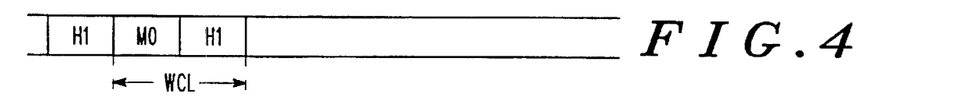
FIG. 4–FIG. 8 show sequences of time slots and the associated number of time slots during WCL.

With respect to FIG. 4 now it is assumed that only the channels CH0 and CH1 are enabled and that the rest of the channels CH2–CH15 is disabled and can thus not issue any access requests. It is assumed that CH0 is a middle priority channel and that CH1 is a high priority channel. FIG. 4 shows the sequence S2 for the case considered here. After the high priority channel CH1 raised its access request in the time slot denoted H1 at the time T2 (cf. FIG. 2) access is granted to the middle priority channel CH0 in the time slot M0 and then to the requesting high priority channel CH1 in the consecutive time slot H1 according to the sequence S2. As a consequence the number of middle priority time slots during the WCL which is denoted M-SLOTS in the following equals one and the number of high priority slots during WCL which is denoted H-SLOTS in the following also equals 1.

Figure 5:
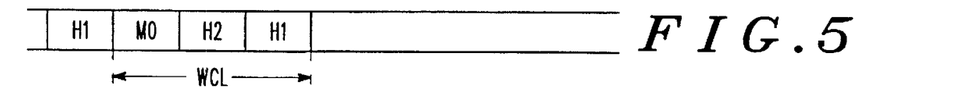

In the following it is assumed that an additional high priority channel CH2 is enabled and therefore becomes a requesting channel which can issue access requests. FIG. 5 shows the resulting sequence S2 for this case. In this case M-SLOTS equals 1 and H-SLOTS equals 2.

Figure 6:
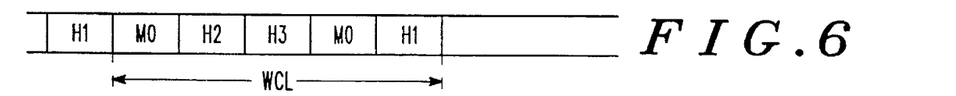

If the high priority channel CH3 is also enabled the following situation occurs: according to the sequence S2 a middle priority channel can get access after the time slot which is denoted H3. It is assumed that the only active middle priority channel CH0 always requests service so that the sequence shown in FIG. 6 results. Hence both H-SLOT and M-SLOT are incremented.

Figure 7:
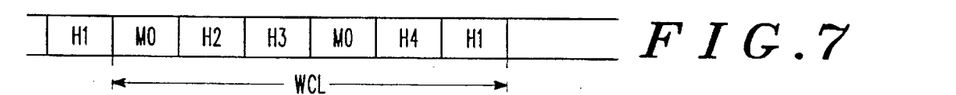
Figure 8:
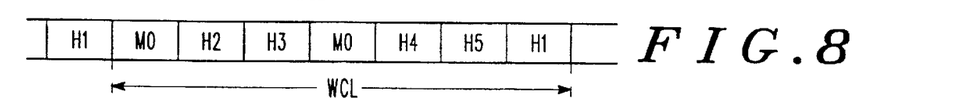

Likewise if the high priority channel CH4 is enabled and if the high priority channel CH5 is also enabled H-SLOT is incremented twice and M-SLOT remains the same like it is shown in FIGS. 7 and 8, respectively.

Figure 9:
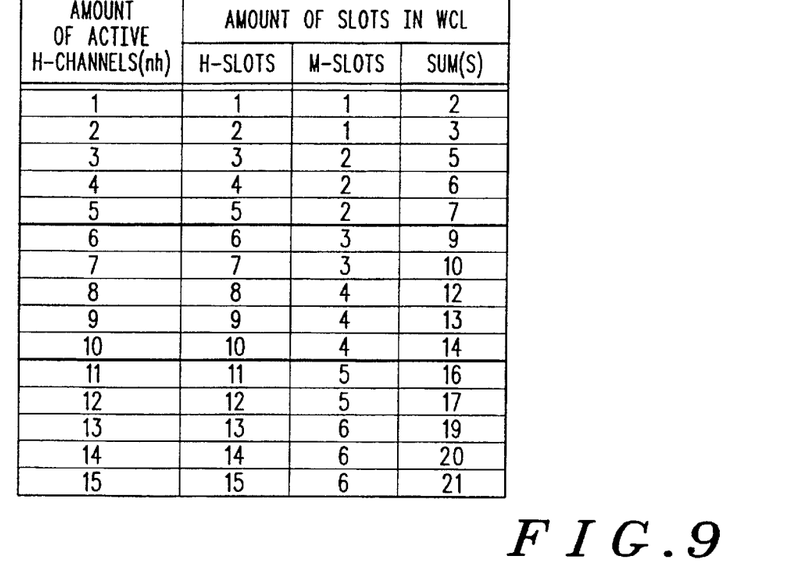
FIG. 9 shows a table which lists the amounts of slots in WCL for different amounts of active high priority channels for the case of high and middle priority requesting channels.

FIG. 9 shows a table containing in the left most column the amount of enabled—or in other words active—high priority channels; this amount is denoted NH. In the second and third column the corresponding number H-SLOTS and M-SLOTS is indicated as well as the sum of H-SLOTS and M-SLOTS which is denoted S.

Figure 10:
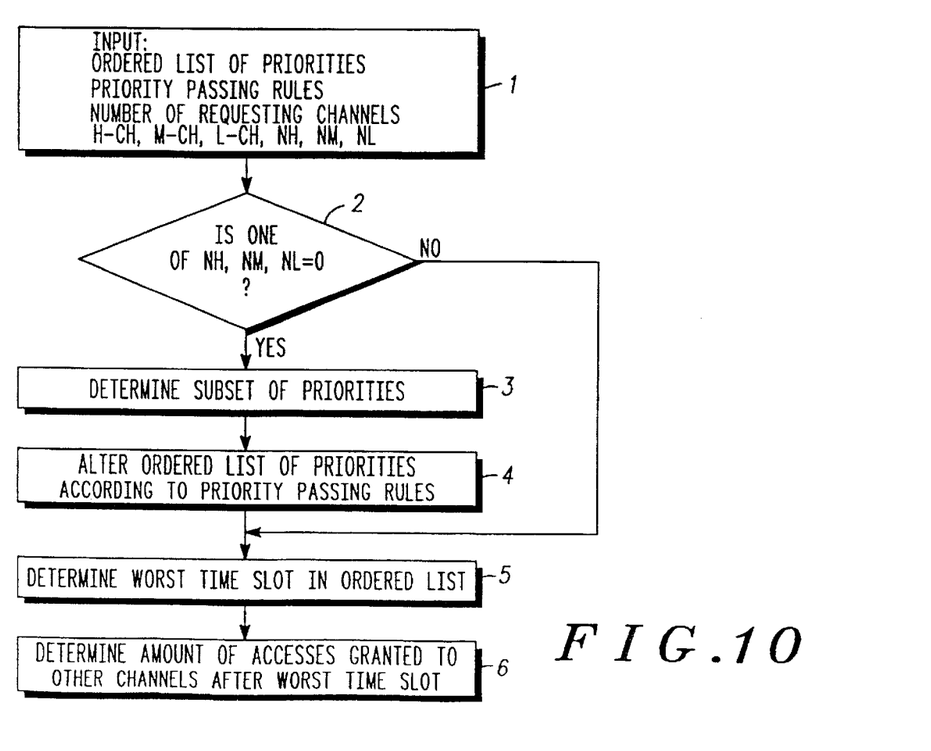
FIG. 10 shows a flow chart of one embodiment of the method for determining a number of accesses granted during WCL.

FIG. 10 shows a flow chart of one embodiment of a method for determining a number of accesses granted to requesting channels in accordance with the invention. In step 1 an ordered list of priorities as well as the corresponding priority passing rules are inputted. Further the number of requesting channels for each priority is inputted. In the case of three priorities this is the number of the requesting high priority channels NH, the number of middle priority channels NM and the number of low priority channels NL.

In step 2 it is determined whether there is no requesting channel for one of the priorities. In the case of three priorities this means that it is decided whether one of the numbers NH, NM or NL equals 0. If this is the case a sub-set of priorities is determined in step 3 which contains only those priorities for which there are requesting channels.

In step 4 the ordered list of priorities is altered according to the priority passing rules. In step 5 the worst time slot in the ordered list determined in step 4 is identified for a selected one of the requesting channels for which the WCL is to be calculated. If the decision in step 2 is "NO" the control directly goes to step 5 whereby steps 3 and 4 are bypassed.

In step 6 the amount of accesses granted to other channels after the worst time slot until the selected requesting channel can be granted access is determined like explained with reference to the foregoing examples.

Figure 11:
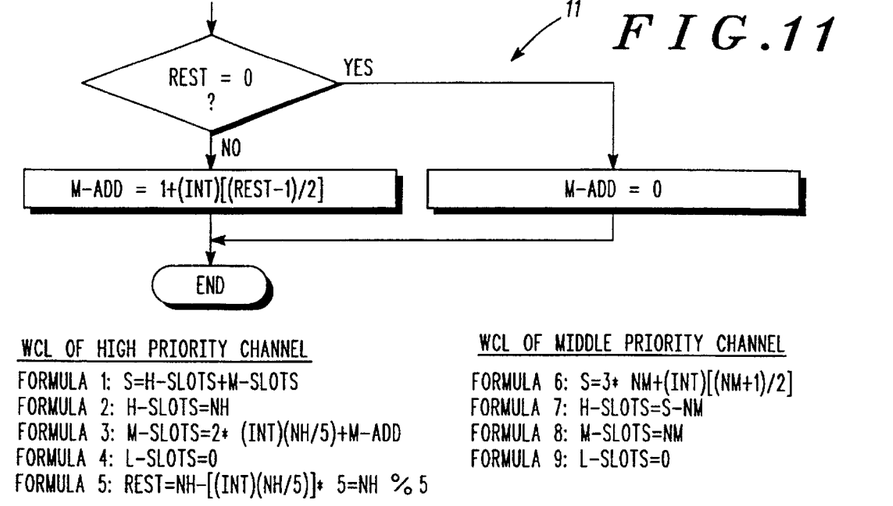
FIG. 11 shows a mathematical model as an alternative to carrying out the method of FIG. 10.

Instead of carrying out the steps illustrated in the flow chart of FIG. 10 it is also possible to employ a mathematical model. For the case that only high and middle priority channels are active, FIG. 11 shows the formulas 1 to 5 as well as flow chart 11 which represent a mathematical model of the steps of FIG. 10. As input parameter only the number of high priority channels NH is required if the ordered list of priorities 132.1 and the corresponding priority passing rules 136, 137, 138 are valid.

The formulas 1 to 5 as well as flow chart 11 model the process of finding H-SLOTS and M-SLOTS as explained with respect to FIGS. 4 to 8. The % symbol in formula 5 means "the rest of division"—in this case the rest of the division of NH by to 5. The parameter M-ADD in formula 3 is found by making usage of the flow chart 11.

If the value of REST=0 according to formula 5 the parameter M-ADD also equals 0 whereas in the alternative case the parameter M-ADD equals the integer part of REST-1 divided by 2 plus 1. For the calculation of the WCL of a middle priority channel in the same case (only high and middle priorities present) the formulas 6, 7, 8 and 9 as indicated in FIG. 11 can be employed. The parameter L-SLOTS which is the number of access granted to requesting channel having a low priority during WCL of the selected channel is always zero since in the case considered here there are no active low priority channels.

Figure 12:
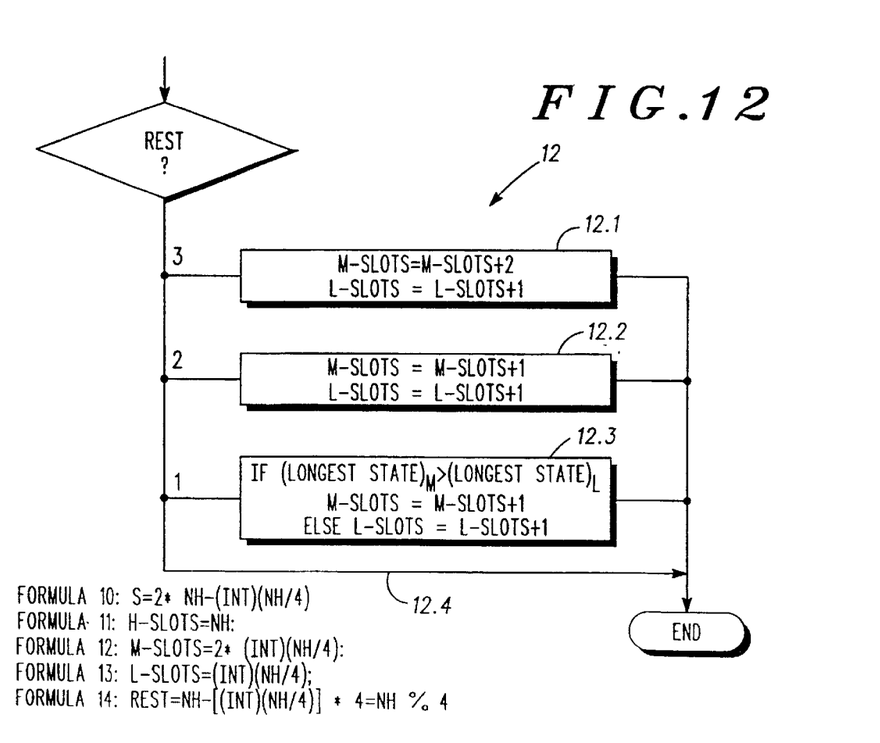
FIG. 12 shows mathematical model similar to the mathematical model of FIG. 11 to model the information contained in the table of FIG. 13.

FIG. 12 shows formulas 10, 11, 12, and 14 as well as flow diagram 12. The formulas 10 to 14 together with flow diagram 12 represent a mathematical model of the method for determining a number of accesses granted to requesting channels during WCL for the case that there are requesting channels of all priorities—high, middle and low priorities. The number of accesses granted is calculated for the WCL of a high priority channel.

The parameter REST which is calculated according to formula 14 serves as a basis to determine M-SLOTS and L-SLOTS. If the value of the parameter REST equals 3 then the formulas 12.1 are applied to modify the initial values for M-SLOTS and L-SLOTS as determined by formulas 12 and 13, respectively. If the number of requesting high priority channels NH is given this is sufficient to calculate both M-SLOTS and L-SLOTS as well as REST according to formulas 12, 13 and 14, respectively.

Only if REST equals 3 both the value of M-SLOTS and L-SLOTS is modified according to formulas 12.1. If the formulas 12.1 are applied the initial value of M-SLOTS as determined by formula 12 is incremented by 2 and the value of L-SLOTS as determined by formula 13 is incremented by 1.

In case that the value of REST equals 2 the formulas 12.2. are applied to modify the initial values of M-SLOTS and L-SLOTS as determined by formulas 12 and 13, respectively. In this case both M-SLOTS and L-SLOTS are incremented by 1.

If the value of the parameter REST equals 1 then the formulas 12.3 are applied. For the evaluation of formulas 12.3 an additional information is required: formulas 12.3 require as an input whether the middle priority requesting channels or the low priority requesting channels have a state with the longest state execution time: If any of the states of any of the requesting middle priority channels is longer than any other state of the low priority requesting channels this means that only the value of M-SLOTS is incremented by one and that L-SLOTS remains unchanged with respect to formula 13. In the opposite case the value of M-SLOTS remains unchanged with respect to formula 12 and only the value of L-SLOTS is incremented by one.

In case that value of parameter REST equals 0 then according to alternative 12.4 in the flow diagram 12 the values of M-SLOTS and L-SLOTS as yielded by formulas 12 and 13, respectively, remain unchanged.

The value of H-SLOTS is determined by formula 11 and always equals the number of the requesting high priority channels NH. It is assumed that all the other high priority channels are serviced before the selected high priority channel for which it's WCL is to be determined is granted access. The same principle also applies for the determination of the WCL for other priorities.

Figure 13:
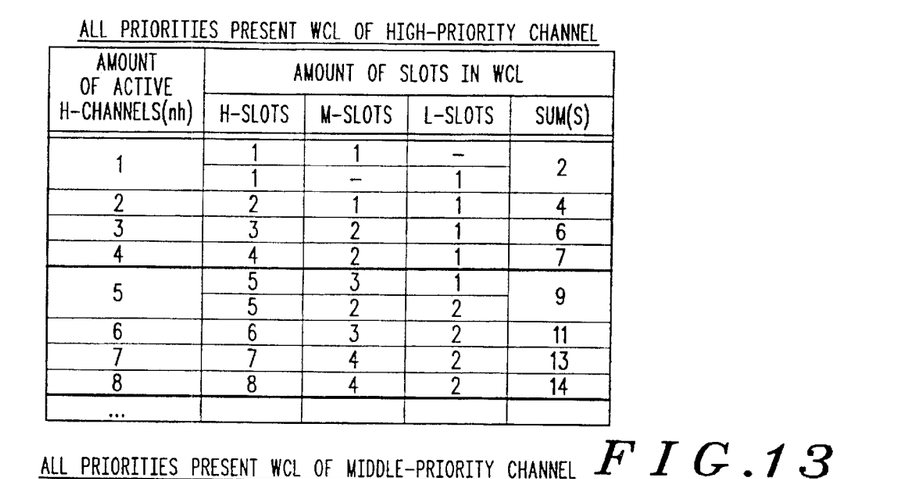
FIG. 13 shows a table similar to the table of FIG. 9 for the case that all priorities are present.

FIG. 13 shows a table similar to the table shown in FIG. 9 for the case to which the mathematical model of FIG. 12 applies. The table of FIG. 13 can be found by evaluating the mathematical model of FIG. 12 for different values for the amount of requesting high priority channels NH. As an alternative the table shown in FIG. 13 can also be found according to the method as explained with reference to FIG. 10. For the case considered here where all priorities are present the ordered list of priorities 132.1 as shown in FIG. 2 remains unchanged. It is therefore also not necessary to determine a sub-set of priorities like in step 3 of FIG. 10.

For the case of NH=1 and NH=5 FIG. 13 shows alternative values for M-SLOTS and L-SLOTS which correspond to the two cases of formulas 12.3 of FIG. 12.

In practice first a table as shown in FIG. 13 can be established by applying an embodiment of the invention according to FIG. 10. The information contained in such a table can then be represented by a mathematical model as shown in FIG. 12.

Figure 14:
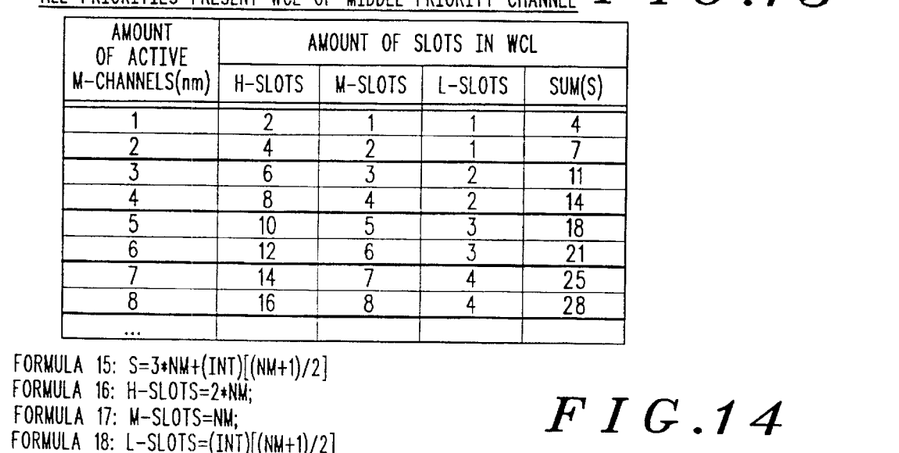
FIG. 14 shows a table similar to the table of FIG. 13 for the case of the WCL of the middle-priority channel as well as the associated mathematical model.

FIG. 14 shows a table similar to the table of FIG. 13 for the same case that there are requesting channels of all priorities but for determining the number of accesses granted during WCL of a selected middle priority channel. For the evaluation of the corresponding mathematical model as represented by formulas 15, 16, 17 and 18 only the amount of requesting middle priority channels NM is required as an input parameter. The same applies analogously for FIG. 15 which shows a corresponding table for the number of accesses granted to requesting channels during WCL of a low priority channel. Again only the amount of requesting low priority channels NL is required as an input parameter for evaluating the mathematical model as represented by formulas 19, 20, 21 and 22.

In the example which is considered in the following only the input channels CH0, CH1, CH5, CH6 and CH15 of the input array 112 of automobile electronics 100 as shown in FIG. 1 are requesting channels and all other channels are disabled. A channel is considered a requesting channel if at least from time to time the channel wants to access the shared system resources, i.e. the execution unit 116.

Figure 16:
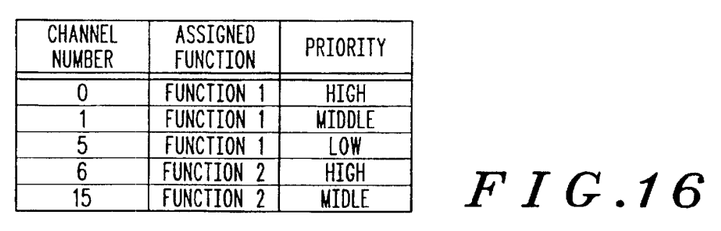
FIG. 16 shows the assignment of channels to functions and their corresponding priorities.

Further, in the example considered here there are only two different functions, function 1 and function 2, to be carried out for all the requesting channels. Each requesting channel has only one function assigned thereto. For example, the channel CH0 has the function 1 and is a high priority channel. The corresponding information for the other requesting channels CH1, CH5, CH6 and CH15 is shown in the table of FIG. 16.

Figure 17:
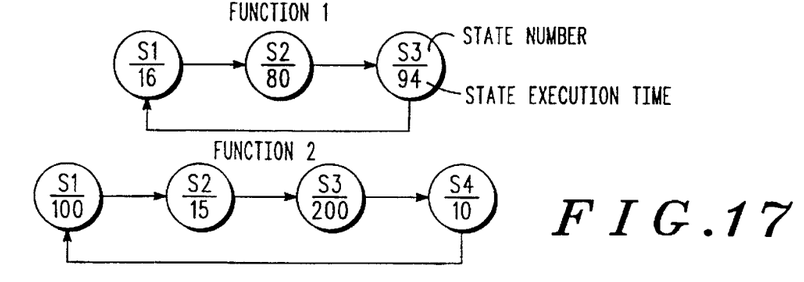
FIG. 17 shows two examples of function state flow charts.

FIG. 17 shows a state diagram for function 1 and function 2. A state of one of the function is defined to be a specific number of micro constructions that can not be interrupted when executed by the execution unit 116 shown in FIG. 1. Function 1 comprises the three states S1, S2 and S3. The relative state execution time of state S1 is 16, of state S2 80 and of state S3 94. The function 2 comprises 4 states S1, S2, S3 and S4 which have relative state execution times of 100, 15, 200 and 10, respectively.

Figure 15:
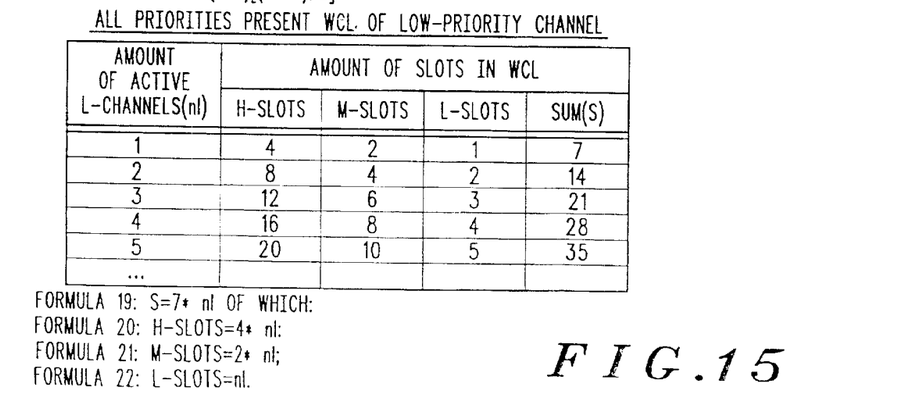
FIG. 15 shows a table similar to the table of FIG. 14 for the case of the WCL of the low-priority channel as well as the associated mathematical model.

If the user wants to determine the length of the WCL of channel CH5 this corresponds to the case as explained with reference to FIG. 15 since there are requesting channels of all priorities and channel CH5 is a low priority channel. The amount of requesting low priority channels NL in this case equals NL=1 so that according to formula 19 the value of S equals 7, according to formula 20 H-SLOTS equals 4, according to formula 21 M-SLOTS equals 2 and according to formula 22 L-SLOTS equals 1.

These results show that during the WCL of channel CH5 there is a total of S-1=6 accesses granted to other requesting channels until access is granted to channel CH5 because S=7. To determine the actual value of the WCL in terms of execution time the numbers of H-SLOTS, M-SLOTS and L-SLOTS have to be replaced by the corresponding execution times of real states.

In order to carry out this assignment of execution times to time slots for each of the priorities an array is generated. For channel CH5 this is a one dimensional array since there is only one low priority requesting channel. The array is sorted from the left to the right so that the left most element has the longest state execution time which is 94 according to the diagram of function 1 shown in FIG. 17. The following two array elements are 80 and 16.

If more than one low priority channel is present one dimension is added to the array for each additional channel. Again the array elements of other dimensions are sorted in descending order from the left to the right. The left most elements in the array for channel CH5 have a pointer.

In the example considered here the array element which has the pointer is selected to be assigned to the one L-SLOT because the left most element is the state with the longest execution time. If more than one L-SLOT would be present then the pointer would be advanced one element to the right so that the next element would be selected as the element having the largest state execution time from all elements in the array having a pointer.

Figure 18:
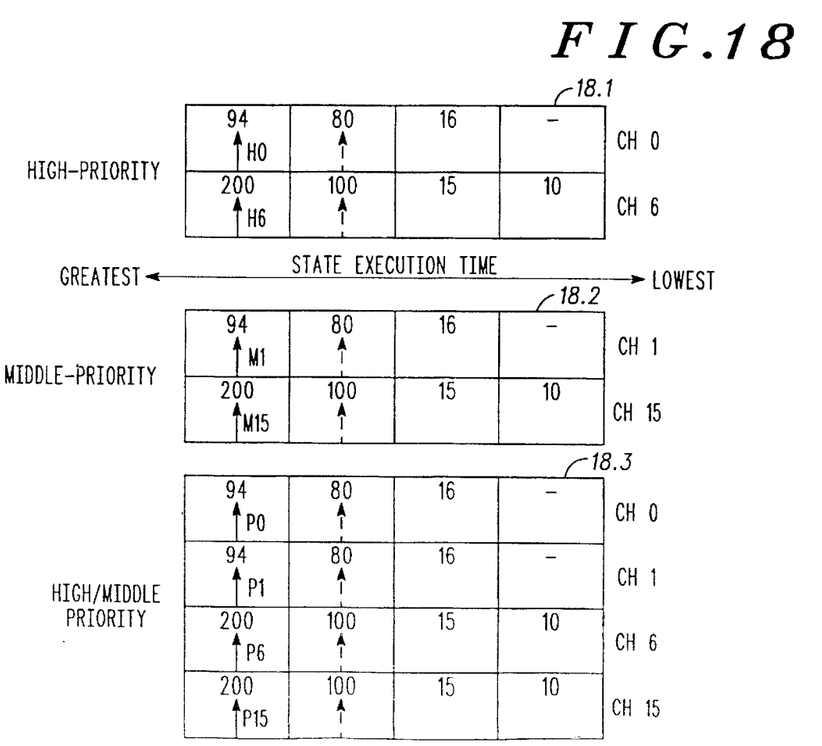
FIG. 18 shows the calculation of the WCL based on state execution times of the functions.

The same applies analogously for array 18.3 shown in FIG. 18. This array comprises four dimensions in the vertical direction: one for each of the channels CH0, CH1, CH6 and CH15. In the horizontal direction the array comprises as many array elements as there are states in the function of a channel. Each array element is representative of the state execution time of one specific state. The array elements are sorted for each channel in descending order from the left to the right. Initially the left most elements have a pointer P0, P1, P6 and P15, respectively assigned thereto.

It is possible to generate only one array which is representative of all the high and middle priority channels because of the applicable priority passing rules 136 and 137 as shown in FIG. 1. It is assumed that there is always at least one request of a low priority channel since this is the type of channel for which the WCL has to be determined. However for the other channels, i.e. high and middle priority channels, it is assumed that these channels do not request access to the common system resources continuously but that there are time intervals in which there are no such requests.

If for example there is a time slot H for a high priority channel in the sequence of time slots as determined by the scheduler 114 but there is no request of a high priority channel at this time, priority passing rule 136 applies so that access is granted to a middle priority channel which might request access at that time. Hence, if the priority passing rules 136 and 137 would not allow the interchangeability of high and middle priority time slots it would be necessary to generate a separate array for each priority.

For the case that there is no interchangeability of the high and middle priority time slots the corresponding arrays 18.1 and 18.2 for the high priority and middle priority channels, respectively, are also shown in FIG. 18. The array elements are arranged and sorted according to the same principles as explained with reference to the array 18.3. The difference between the arrays 18.1, 18.2 with respect to array 18.3 is that each of the arrays 18.1 and 18.2 only contains state execution times for channels having the same priority. In the arrays 18.1 and 18.2 initially the left most array elements have pointers H0, H6 and M1, M15 assigned thereto.

Considering now the example of array 18.3 again the following steps are carried out to select the proper array elements to calculate the WCL: the array element having the greatest value of all array elements having a pointer assigned thereto is selected and the corresponding pointer is moved one element to the right. In the example considered here the first array element can be either the left most element of the row in the array of channel CH6 or of channel CH15 since both respective state execution times equal 200.

If the left most array element of channel 15 is selected the pointer P15 is moved one element to the right. In the next step another array element is to be selected according to the same criteria. Since the left most element of channel CH6 is representative of the greatest state execution time of all array elements of array 18.3 which have a pointer assigned thereto this is the next element to be selected. Likewise, the pointer P6 is moved one element to the right. The moved pointers are symbolized by the dashed arrows in FIG. 18.

The next array elements which are selected according to these rules are the array elements being representative of the state execution time 100 of the channels CH6 and CH15. Again the pointers P6 and P15 are moved one element to the right. As a consequence the pointers P6 and P15 point to array elements having a state execution time of 15. As a consequence in the next two steps the left most array elements of the channels CH0 and CH1 are selected and the corresponding pointers P0 and P1 are moved one element to the left. As the parameter S equals 6 since H-SLOTS=3 and M-SLOTS=3, a number of S elements have been selected and the selection process stops at this stage; the WCL is calculated by summing up the selected array elements from the array 18.3 and also from the array of the low priority channel CH5 which is not shown in the drawing.

This yields the following equation for calculating the WCL, whereas the symbols in brackets behind the state execution times symbolize the corresponding selected channels:

$$WCL=200(CH15)+200(CH6)+100(CH15)+100(CH6)+94(CH1)+94(CH0)+94(CH5)=882.$$

If the same method for selecting array elements is applied separately to the arrays 18.1 and 18.2 this means that a number of H-SLOTS=4 elements has to be selected from the array 18.1 and a number of M-SLOTS=2 elements has to be selected from the array 18.2. This is because in the example considered with respect to arrays 18.1 and 18.2 there is no interchangeability between high priority and middle priority time slots. Thus from the array 18.1 the two left most elements of channel 0 and channel 6 are selected and from the array 18.2 only the two left most elements of channel CH15 are selected. This yields the following equation for calculating the WCL:

$$WCL=200(CH6)+100(CH6)+94(CH0)+80(CH0)+200(CH15)+100(CH15)+94(CH5)=868.$$

Figure 19:
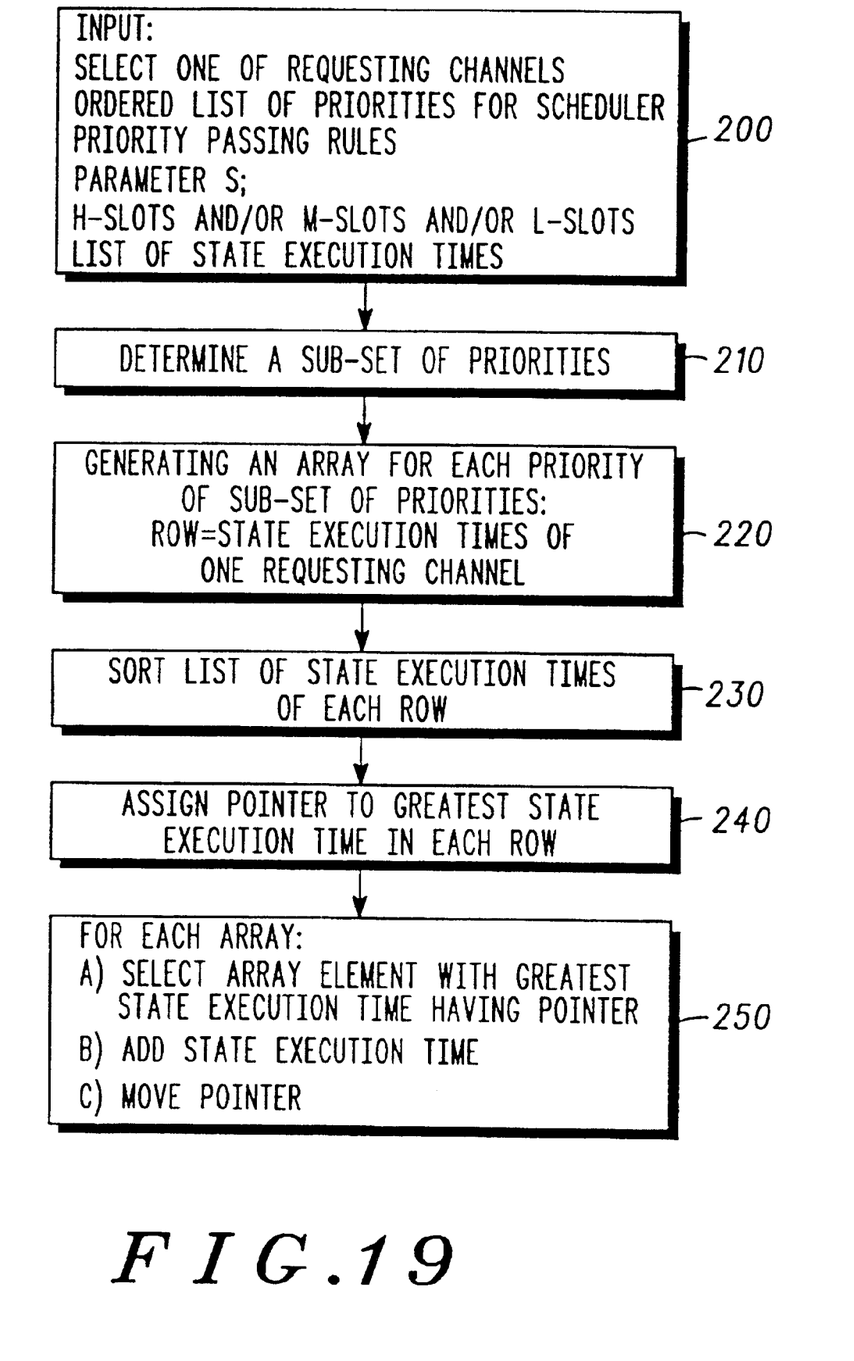
FIG. 19 is a flow chart illustrating one embodiment of the invention to determine the WCL.

FIG. 19 is a flow chart of one embodiment of the method according to the invention to determine the WCL of a selected requesting channel. As further input parameters for the method an ordered list of priorities similar to the ordered list 132.1 of FIG. 1 is required as well as a set of priority passing rules. The parameter S as well as the values of H-SLOTS, M-SLOTS and L-SLOTS can be determined by any of the above explained methods, i.e. either by using a table or evaluating a-mathematical model.

Also in step 200 the list of state execution times for all requesting channels are inputted. In step 210 a sub-set of priorities is determined which comprises only priorities of requesting channels. If there is at least one requesting channel of each priority then the sub-set determined in step 210 is identical to the complete set of priorities.

In step 220 an array is generated for each priority of the sub-set of priorities determined in step 210. Each row in the array is representative of the state execution times of requesting channel. If there is interchangeability between the priorities of the requesting channels according to the priority passing rules the generation of array for the interchangeble channels is sufficient. In any case separate arrays for channels having the priority of the selected channel for which the WCL is to be determined and the other requesting channels are required.

In step 230 the state execution times in each row are sorted and pointers are assigned in step 240 to the left most element in each row so that arrays similar to arrays 18.1 and 18.2 or 18.3 of FIG. 18 result.

In step 250 in a selected array the element with the greatest state execution time is selected and added to the WCL. The corresponding pointer is moved one element to the right and another array element is selected until a number of elements are selected corresponding to the respective number of slots of that priority.

For example if the array for high priority channels is selected then a number of H-SLOTS array elements has to be selected from this array. This is done for all arrays including the array having the priority of the selected requesting channel for which the WCL is to be calculated. If the priority passing rules allow the interchangeability of priorities which do not equal the priority of the selected channel then the respective arrays can be joined in order to facilitate the calculation and produce a more accurate result.

What is claimed is:

1. A method for determining a number of accesses granted to requesting channels in a queuing system during worst case service latency (WCL) of a selected one of a plurality of requesting channels (CH0, CH1, CH2, ... CH15) of said queuing system, each of said requesting channels having assigned thereto a priority (H, M, L) of a set of priorities, whereby access is granted to a requesting channel in said queuing system by a scheduler (114), said scheduler comprising an ordered list of priorities (132), whereby said ordered list of priorities is altered according to predetermined priority passing rules (136, 137, 138), if a corresponding access request is not present, said method comprising the steps of
    a) determining a sub-set of said set of priorities, said sub-set only comprising the priorities of the requesting channels;
    b) altering said ordered list of priorities according to said priority passing rules, if said sub-set and said set of priorities are not identical;

said method being characterized by the steps of:
    c) selecting a time slot in said ordered list of priorities having the priority of said selected channel and preceding a time slot having another priority;
    d) determining the lowest ratio of number of time slots having the priority of the selected channel to number of time slots having another priority in said ordered list, wherein said selected time slot being a worst time slot in said ordered list of priorities in terms of worst case service latency for an access request of said selected channel; and
    e) determining said number of accesses by determining the amount of accesses granted once to each one of said requesting channels after said worst time slot according to said ordered list of priorities until access is granted to said selected channel.

2. A method for running in a computer to automatically determine a worst case service latency (WCL) of a selected one of a plurality of requesting channels (CH0, CH1, CH2, ... CH15) of a queuing system, each of said requesting channels having assigned thereto a priority (H, M, L) of a set of priorities, whereby access is granted to a requesting channel in said queuing system by a scheduler (114), said scheduler comprising an ordered list of priorities (132), whereby said ordered list of priorities is altered according to predetermined priority passing rules (136, 137, 138), if a corresponding access request is not present, said method comprising the steps of:
    a) determining a sub-set of priorities of said set of priorities, said sub-set only comprising the priorities of the requesting channels;
    b) inputting a number of accesses granted to requesting channels in said queuing system during worst case service latency of said selected one of said plurality of requesting channels;
    c) inputting a list of state execution times of a function for each of said requesting channels;
    d) generating an array for each priority of said sub-set of priorities, each row in each of said arrays being representative of one of said lists of state execution times;
    e) sorting said lists of state execution times being represented by said rows in said arrays in descending order;
    f) assigning a pointer to a greatest state execution time in each of said rows;
    g) for each said priority of said sub-set of priorities:
        g1) selecting an array element of said array of said priority, said array element being representative of the greatest state execution time of all of said array elements which have a pointer assigned thereto;
        g2) adding said state execution time being represented by said array element selected in step g1) to said worst case service latency;
        g3) moving said pointer of said array element selected in step g1) to the next array element of the same of said requesting channels in descending order, and
        g4) repeating said steps g1) to g3) for a number of times corresponding to said number of accesses granted to said requesting channels of said priority.

3. The method according to claim 2 wherein said arrays for at least two of said priorities being merged into one single array to replace said arrays for said two of said priorities, and said process of merging is carried out if said two of said priorities are interchangeable according to said priority passing rules and if none of said two of said priorities is equal to said priority of said selected one of said plurality of requesting channels.

4. A computer program for carrying out a method according to claim 1.

5. An apparatus for determining a number of accesses granted to requesting channels, said apparatus comprising a queuing system for a plurality of requesting channels (CH0, CH1, CH2, . . . CH15), each of said requesting channels requiring a worst case service latency (WCL) which does not surpass a predefined maximal worst case service latency, each of said requesting channels having assigned thereto a priority (H, M, L) of a set of priorities, whereby access is granted to one of said requesting channels in said queuing system by a scheduler (114), said scheduler comprising an ordered list of priorities (132), whereby said ordered list of priorities is altered in accordance with predetermined priority passing rules (136, 137, 138), if a corresponding access request is not present, said apparatus further comprising:
  a) means for determining a sub-set of said set of priorities, said sub-set only comprising the priorities of the requesting channels;
  b) means for altering said ordered list of priorities according to said priority passing rules, if said subset and said set of priorities are not identical;
said apparatus being characterized in that it further comprises:
  c) means for selecting a time slot in said ordered list of priorities having the priority of said selected channel and preceding a time slot having another priority;
  d) means for determining the lowest ratio of number of time slots having the priority of the selected channel to number of time slots having another priority in said ordered list, wherein said selected time slot being a worst time slot in said ordered list of priorities in terms of worst case service latency for an access request of said selected channel; and
  e) means for determining said number of accesses by determining the amount of accesses granted once to each one of said requesting channels after said worst time slot according to said ordered list of priorities until access is granted to said selected channel.

6. A computer program for performing a method to automatically determine a worst case service latency (WCL) of a selected one of a plurality of requesting channels (CH0, CH1, CH2, . . . CH15) of a queuing system, each of said requesting channels having assigned thereto a priority (H, M, L) of a set of priorities, whereby access is granted to a requesting channel in said queuing system by a scheduler (114), said scheduler comprising an ordered list of priorities (132), whereby said ordered list of priorities is altered according to predetermined priority passing rules (136, 137, 138), if a corresponding access request is not present, said computer program comprising:
  a) a first set of instructions for determining a subset of priorities of said set of priorities, said subset only comprising the priorities of the requesting channels;
  b) a second set of instructions for inputting a number of accesses granted to requesting channels in said queuing system during worst case service latency of said selected one of said plurality of requesting channels;
  c) a third set of instructions for inputting a list of state execution times of a function for each of said requesting channels;
  d) a fourth set of instructions for generating an array for each priority of said sub-set of priorities, each row in each of said arrays being representative of one of said lists of state execution times;
  e) a fifth set of instructions for sorting said lists of state execution times being represented by said rows in said arrays in descending order;
  f) a sixth set of instructions for assigning a pointer to a greatest state execution time in each of said rows;
  g) a seventh set of instructions, which, for each said priority of said sub-set of priorities,
    g1) selects an array element of said array of said priority, said array element being representative of the greatest state execution time of all of said array elements which have a pointer assigned thereto;
    g2) adds said state execution time being represented by said array element selected in step g1) to said worst case service latency;
    g3) moves said pointer of said array element selected in step g1) to the next array element of the same of said requesting channels in descending order; and
    g4) repeats said steps g1) to g3) for a number of times corresponding to said number of accesses granted to said requesting channels of said priority.

* * * * *